(12) United States Patent
Wang (10) Patent No.: US 8,733,787 B2
(45) Date of Patent: May 27, 2014

(54) BABY CARRIAGE

(71) Applicant: Goodbaby Child Products Co., Ltd, Jiangsu (CN)

(72) Inventor: Junma Wang, Lujia Town Kunshan (CN)

(73) Assignee: Goodbaby Child Products Co., Ltd, Jiangsu (CN)

( * ) Notice: Subject to any disclaimer, the term of this patent is extended or adjusted under 35 U.S.C. 154(b) by 0 days.

(21) Appl. No.: 14/066,159

(22) Filed: Oct. 29, 2013

(65) Prior Publication Data

US 2014/0117647 A1 May 1, 2014

(30) Foreign Application Priority Data

Oct. 31, 2012 (CN) .......................... 2012 1 04261251

(51) Int. Cl.
*B62B 1/00* (2006.01)

(52) U.S. Cl.
USPC ......................................................... 280/658

(58) Field of Classification Search
USPC ......... 280/33.993, 47.38, 639, 642, 643–644, 280/647, 648, 649–650, 658; 297/195.13, 297/218.1, 218.2, 218.3, 219.12, 440.11
See application file for complete search history.

(56) References Cited

U.S. PATENT DOCUMENTS

| 4,180,276 | A | * | 12/1979 | Kassai | 280/47.36 |
| 4,746,140 | A | * | 5/1988 | Kassai | 280/642 |
| 5,645,293 | A | * | 7/1997 | Cheng | 280/642 |
| 7,267,359 | B1 | * | 9/2007 | Yang et al. | 280/642 |
| 7,273,225 | B2 | * | 9/2007 | Yeh | 280/648 |
| 7,401,803 | B1 | * | 7/2008 | Lai | 280/647 |
| 8,448,976 | B2 | * | 5/2013 | Funakura | 280/642 |
| 2013/0113185 | A1 | * | 5/2013 | Zehfuss | 280/647 |

* cited by examiner

*Primary Examiner* — John Walters
*Assistant Examiner* — James Triggs
(74) *Attorney, Agent, or Firm* — Stites & Harbison PLLC; Cong Ding (57) ABSTRACT

A baby carriage is disclosed in the invention, the baby carriage comprises a folding frame, a seat disposed on the frame, a locking mechanism for locking the frame when it is unfolded, front and rear wheel assemblies disposed at the bottom of the frame. The frame comprises: front brackets; seat rods with front portions being connected to the front brackets; push rods with lower portions being rotatably connected to the upper portions of the front brackets or the front portions of the seat rods; rear brackets with lower portions being rotatably to seat rods; and sliding elements for connecting the upper portions of push rods with the upper portions of the rear brackets. The sliding elements are slidably disposed on one of the push rods and rear brackets, and rotatably connected to the other one. The seat is set on the seat rods.

11 Claims, 12 Drawing Sheets

BABY CARRIAGE

RELATED APPLICATIONS

This application claims priority to CN application no. CN2012104261251 filed Oct. 31, 2012 under 35 U.S.C. 119 (a).

FIELD OF THE INVENTION

The present invention relates to a baby carriage.

DESCRIPTION OF THE RELATED ART

Generally, a baby carriage in the prior art comprises a folding frame, front wheel assemblies disposed at the bottom of front portions of the frame, rear wheel assemblies disposed at the bottom of back portions of the frame, a locking mechanism for locking the frame when it is unfolded, and a seat set on the frame. Currently, there exist a wide variety of frames in which the number of rods of the frame, the connections and connection locations between rods are different from each other, thus the usage and functionalities of the frames are different from each other.

SUMMARY OF THE INVENTION

The technical problem to be solved by the invention is to provide a reversible baby carriage.

In order to overcome the above problem, a baby carriage is provided in the invention, which comprises a folding frame, a seat disposed on the frame, a locking mechanism for locking the frame when it is unfolded, front wheel assemblies and rear wheel assemblies disposed at the bottom of the frame, wherein the frame comprises: front brackets, at the lower portions of which the front wheel assemblies are arranged; seat rods, with front portions being rotatably connected to the front brackets and rear portions being provided with rear wheel assemblies; push rods; rear brackets with lower portions being rotatably connected to the seat rods and sliding elements. The push rods comprise lower push rods with lower portions being rotatably connected to the upper portions of the front brackets or the front portions of the seat rods and upper push rods slidably connected to the lower push rods. The upper push rods and lower push rods are locked with each other when the frame is unfolded, and the upper push rods can slide relative to the lower push rods when the frame is in the course of folding or unfolding. Sliding elements are slidably disposed on one of the push rods and rear bracketsand rotatably connected to the other one. The seat is disposed on the seat rods. when the frame is unfolded the push rods have two working positions, in the first working position, the push rods incline backwards from down to up, and the upper ends of which are located behind and above the seat, in the second working position, the push rods incline forwards from down to up, and the upper ends of which are located in front of and above the seat. Herein, the expressions of front, rear are defined in terms of the general habits of customers. When the frame is folded, the upper and lower push rods slide relative to each other to make the whole push rods shrinking, such that the balance of the frame is maintained after folding. Thus the front and rear wheel assemblies can support the folded frame on a plane to enable it to stand up.

In a particular embodiment, a pair of front brackets, seat rods, push rods, rear brackets, and sliding elements respectively are provided at two opposite sides of the frame, at each side the push rod, front bracket, seat rod, rear bracket and sliding element being connected together to form a main body of a side frame, and between the two side frames at both sides of the frame a transverse brace assembly being connected, which can be transversely folded to draw the two side frames close to each other. The frame can be transversely folded by means of the transverse folding of the transverse brace assembly. The expression "transverse" or "transversely" throughout the invention is defined in terms of the habit of a person skilled in the art. The said "transverse" or "transversely" refers to the direction laterally extending between the left and right sides of the frame.

In a specific example, the transverse brace assembly comprises a front support bracket including two front support rods which intersect and rotatably connect with each other at the intersection joint, the upper ends of the two front support rods respectively being rotatably connected to the seat rods, and the lower ends respectively to the front brackets, and wherein the connection location of the upper ends of the two front support rods with the seat rods being in front of the connection location of the seat rods with the front brackets.

Preferably, the transverse brace assembly comprises a bottom support bracket disposed between the seat rods at two sides of the frame.

More preferably, the bottom support bracket comprises:

a cross brace consisted of two rods which intersects and hingedly connect with each other at the intersection joint; and two connecting rods, each with one end being rotatably connected to one of the two adjacent ends of the cross brace, the other end to one of the seat rods, and the other two ends of the cross brace respectively being rotatably connected to the seat rods at two sides of the frame.

Still more preferably, the transverse brace assembly further comprises a rear support bracket disposed between the rear brackets at two sides of the frame.

Yet still more preferably, the rear support bracket comprises:

an upright rod;

a first transverse rod and a second transverse rod, each of which is provided with a inner end rotatably connected to an upper end of the upright rod, and an outer end rotatably connected to one of the rear brackets at two sides of the frame;

a sliding block slidably disposed on the upright rod;

a third transverse rod and a fourth transverse rod, each of which is provided with a inner end rotatably connected to a lower end of the upright rod, and an outer end rotatably connected to one of the rear brackets at two sides of the frame (1);

a first tilted rod, two ends of which respectively are pivotably connected to the sliding block and the third transverse rod;

a second titled rod, two ends of which respectively are pivotably connected to the sliding block and the fourth transverse rod.

In a preferable embodiment, the axes of rotation of wheels of front wheel assemblies and rear wheel assemblie substantially are in a plane, on which the projection of the connection location of the sliding elements with push rods or rear brackets is between the front and rear wheels.

Preferably, the locking mechanism comprises a first locking mechanism for relatively locking the lower push rods with the front brackets.

More preferably, the locking mechanism also comprises a second locking mechanism for relatively locking the sliding element with the upper push rods and/or rear brackets.

Still more preferably, the locking mechanism further comprises a third locking mechanism for relatively locking the upper push rods with the lower push rods.

In a practical example, one or more of the first locking mechanism, second locking mechanism and third locking mechanism as described above can be provided.

The scope of the invention is not limited to the technical schemes combined particularly by the abovementioned technical features, other technical schemes combined discretionarily by the above-mentioned technical features or equivalent features should also be covered in the present invention, such as the technical schemes formed by exchanging the aforementioned features with the technical features having the similar functions, including but no limited to, disclosed in the invention.

Due to the application of the above technical solution, as compared with the prior art, the invention has the following advantages:

A new technical solution with novel technical conception is disclosed in the invention. The front brackets, push rods, seat rods and rear brackets constitute connecting rod mechanisms. By means of the rotation of the push rods and rear brackets and the sliding of the sliding elements, the frame can be adjusted into two working positions. In the first working position, the frame is in the positive state, the pusher is behind the seat, and the child on the seat is back to the pusher; in the second working position, the frame is converted into the reverse state, the pusher is in front of the seat and faces to the child. In the course of frame folding, the locking mechanism is unlocked, and the push rods draw close to the front brackets such that the front brackets draw close to the back brackets. After folding, the front and rear wheel assemblies are in a same plane to support the frame.

DESCRIPTION OF THE PREFERRED EMBODIMENTS

The present invention will be described hereinafter with reference to the accompanying drawings. It is to be noted, however, that the drawings are given only for illustrative purpose and therefore not to be considered as limiting of its scope, for the invention may admit to other equally effective embodiments.

Embodiment 1

As shown in FIGS. 1-6, the baby carriage comprises: a frame 1 having an unfolded position and a folded position, which can be folded in the directions of anterior-posterior, up-down and left-right; a seat disposed on the frame 1; a locking mechanism for locking the frame 1 when it is unfolded; a first front wheel assembly 51 and a second front wheel assembly 61 disposed on bottom of front portions of the frame, and a first rear wheel assembly 52 and a second rear wheel assembly 62 disposed on bottom of rear portions of the frame 1.

The frame 1 comprises a first front bracket 11, a second front bracket 21, a first seat rod 12, a second seat rod 22, a first push rod 13, a second push rod 23, a first rear bracket 14 and a second rear bracket 24.

The first front wheel assembly 51 is disposed on the lower portion of the first front bracket 11.

The first seat rod 12 is rotatably connected to the first front bracket 11 about a first shaft 31, and the first rear wheel assembly 52 is disposed on the lower portion of the first seat rod 12.

A first sliding element 18 is provided on the first push rod 13, and the upper portion of the first rear bracket 14 is rotatably connected to the first sliding element 18 about a fifth shaft 33.

The lower portion of the first push rod 13 is rotatably connected to the upper portion of the first front bracket 11 about a third shaft 32.

The lower portion of the first rear bracket 14 is rotatably connected to the first seat rod 12 about a seventh shaft 34.

The second front wheel assembly 61 is disposed at the lower portion of the second front bracket 21.

The second seat rod 22 is rotatably connected to the second front bracket 21 about a second shaft 41, and the second rear wheel assembly 62 is disposed at the lower portion of the second seat rod 22.

A second sliding element 28 is provided on the second push rod 23, and the upper portion of the second rear bracket 24 is rotatably connected to the second sliding element 28 about a sixth shaft 43.

The lower portion of the second push rod 23 is rotatably connected to the upper portion of the second front bracket 21 about a fourth shaft 42.

The lower portion of the second rear bracket 24 is rotatably connected to the second seat rod 22 about an eighth shaft 44.

The first front bracket 11, first seat rod 12, first push rod 13 and the first rear bracket 14 constitute a first side frame at one side of the frame, and the second front bracket 21, second seat rod 22, second push rod 23 and the second rear bracket 24 constitute a second side frame at opposite side of the frame. In the illustrated example, the first and second side frames are symmetrical with each other. The first side frame is connected to the second side frame by a transverse brace assembly which can be transversely folded.

The frame 1 has a positive and a reverse working position when it is unfolded. in the positive working position, both the first push rod 13 and the second push rod 23 incline backwards from down to up, and in the reverse working position, both the first push rod 13 and the second push rod 23 incline forwards from down to up.

In the course of the frame converting between the positive and reverse working positions, the second side frame and first side frame have the same change in configuration.

Figure 1:
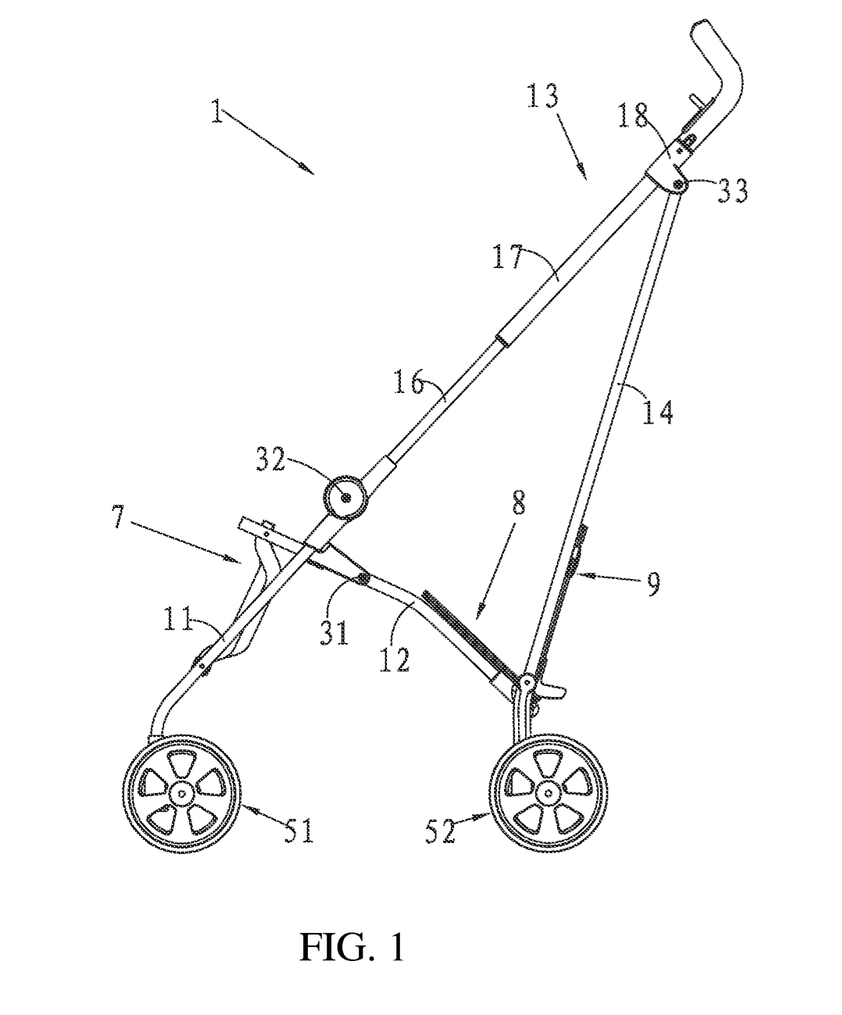
FIG. 1 is a front view of the frame in the positive state according to embodiment 1 of the invention.
Figure 2:
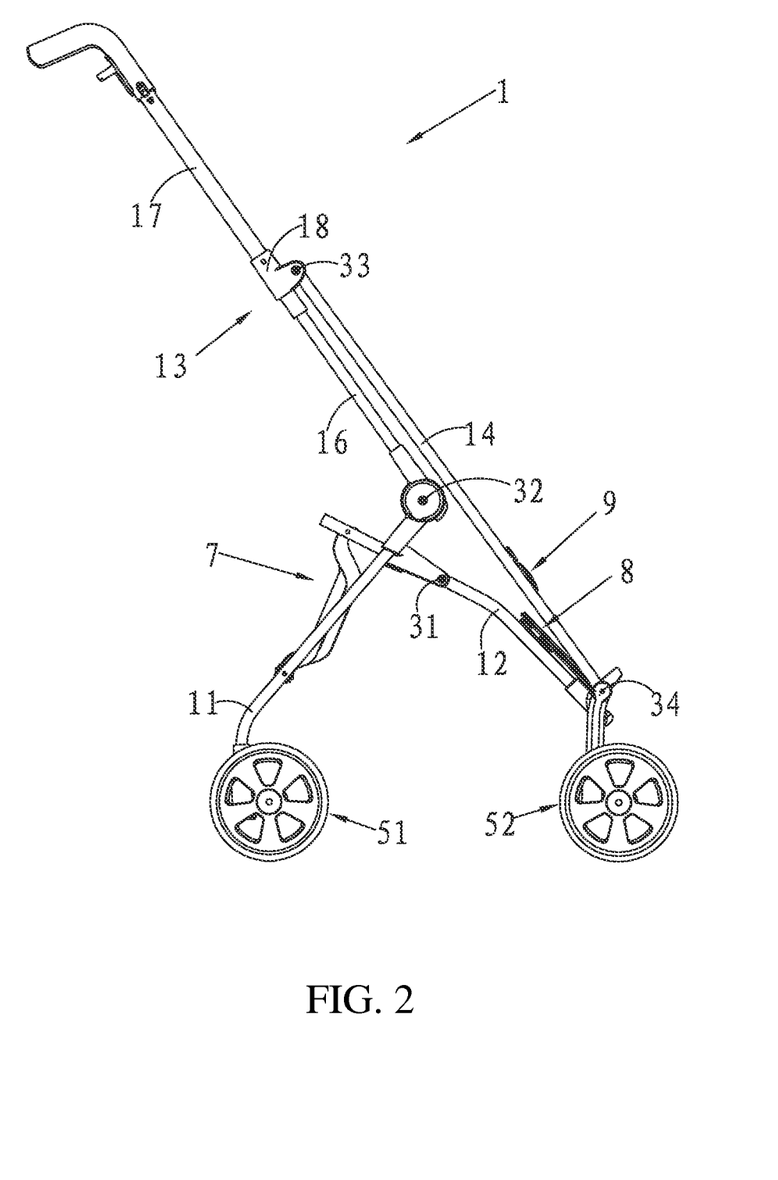
FIG. 2 is a front view of the frame in the reverse state according to embodiment 1 of the invention.

When the frame 1 converts between the positive and reverse working positions, the push rods 13 and 23 rotate about the third shaft 32 and the fourth shaft 42 respectively.

The sliding of the sliding elements 18 and 28 on the push rods causes that the upper portions of the rear brackets 14 and 24 rotate about the fifth shaft 33 and sixth shaft 43 respectively, and the lower portions about the seventh shaft 34 and eighth shaft 44. From this, in the course of frame reversing, various parts rotate about third shaft 32, fourth shaft 42, fifth shaft 33, sixth shaft 43, seventh shaft 34 and the eighth shaft 44 respectively. Consequently, the axes of these shafts preferably are parallel to each other.

Of course, the relative rotation of the various parts such as push rods, front brackets, rear brackets and sliding elements also can be achieved by means of other ways instead of shafts. For example, the rotation is achieved by a rotation joint.

Figure 3:
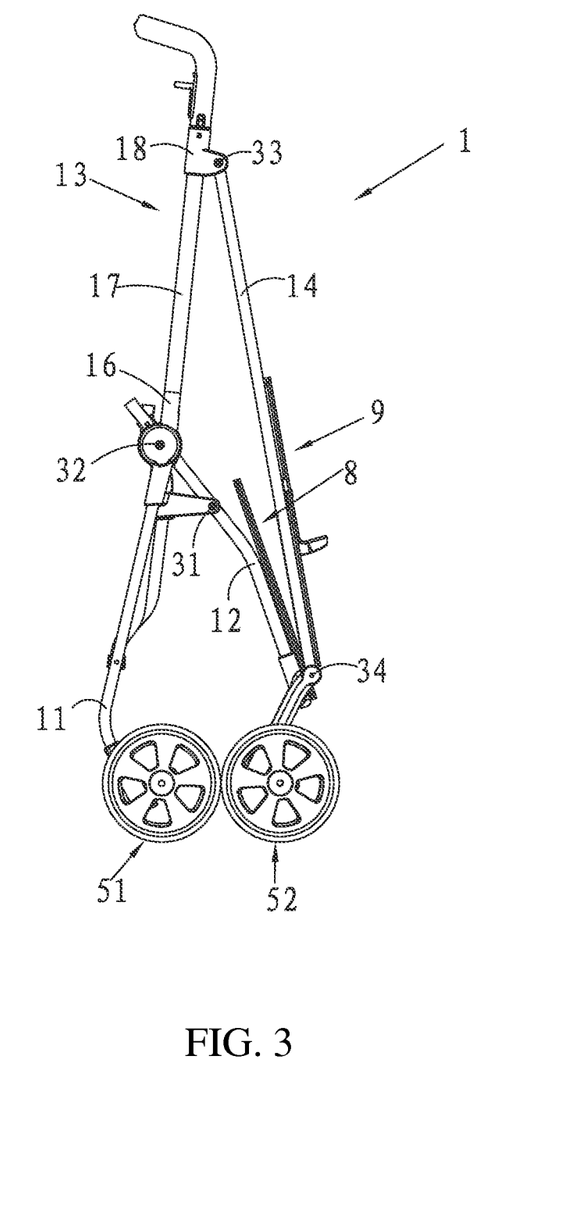
FIG. 3 is a front view of the frame in the state of folding according to embodiment 1 of the invention.
Figure 6:
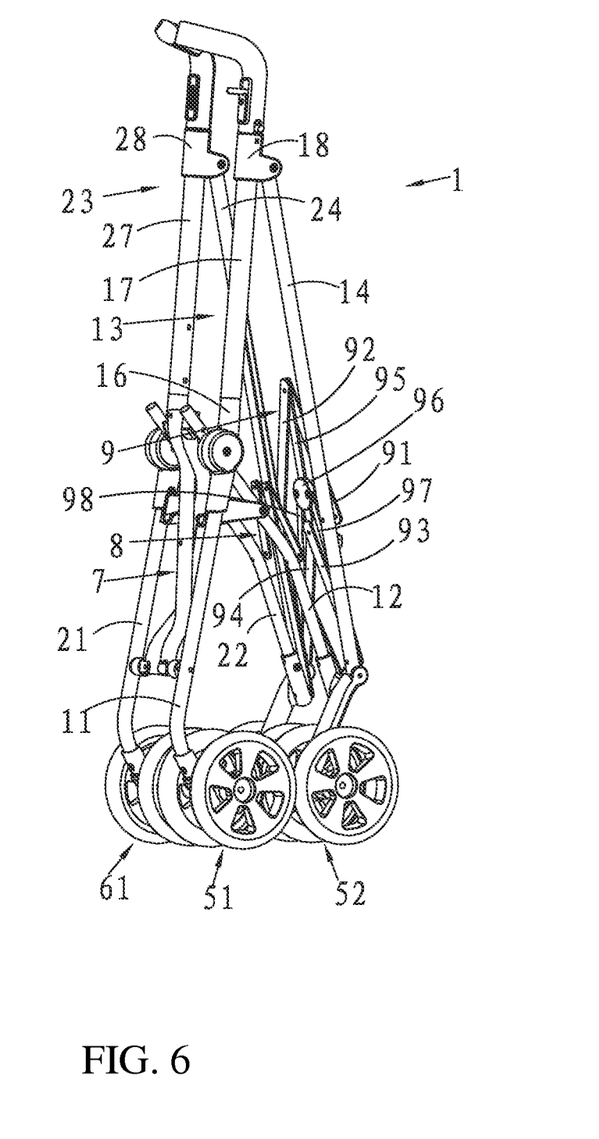
FIG. 6 is a perspective view of the frame in the state of folding according to embodiment 1 of the invention.

When the frame 1 is folded, the front brackets and seat rods rotate relative to each other, and the first seat rod 12 and second seat rod 22 rotate about the first shaft 31 and the second shaft 41 respectively, and the axes of the two shafts preferably are also parallel to the axes of the third shaft 32, fourth shaft 42, fifth shaft 33, sixth shaft 43, the seventh shaft 34 and the eighth shaft 44.

The configurations of the first push rod 13 and the second push rod 23 are described as follows:

The first push rod 13 comprises a first lower push rod 16 and a first upper push rod 17 slidably connected to the first lower push rod 16. The lower portion of the first lower push rod 16 is rotatably connected to the upper portion of the first front bracket 11 about the third shaft 32, and the first sliding element 18 is slidably disposed on the first upper push rod 17. The second push rod 23 comprises a second lower push rod 26 and a second upper push rod 27 slidably connected to the second lower push rod 26. The lower portion of the second lower push rod 26 is rotatably connected to the upper portion of the second front bracket 21 about the fourth shaft 42, and the second sliding element 28 is slidably disposed on the second upper push rod 27. When the frame 1 converts from the positive working position to the reverse working position, primarily, the first sliding element 18 slides downwards relative to the first push rod 13 and the second sliding element 28 slides downwards relative to the second push rod 23. Thus, in the course of the frame 1 reversing, there is no change in the relative position of the first upper push rod 17 and the first lower push rod 16, and there is non change in the relative position of the second upper push rod 27 and the second lower push rod 26. In the course of the frame 1 converting from the unfolded position to the folded position, the first push rod 17 slides downwards relative to the first lower push rod 16, and the second upper push rod 27 slides relative to the second lower push rod 26. Thus, when the frame 1 is in the unfolded position, the first and second push rods 13, 23 are convenient for holding due to a higher location thereof, and after folding the frame 1 is easy to stand up by itself due to the reduced height and volume thereof. As shown in FIG. 6, the folded frame can be supported by the front and rear wheels to stand up on a plane.

The locking mechanism may comprise a first locking mechanism which is disposed between the lower portion of the first lower push rod 16 and the upper portion of the first front bracket 11 and/or between the lower portion of the second lower push rod 26 and the upper portion of the second front bracket 21, the locking mechanism also may comprise a second locking mechanism which is disposed between the first upper push rod 17 and the first sliding element 18 and/or between the second upper push rod 27 and the second sliding element 28, or alternatively, both the first and second locking mechanisms are provided. The locking mechanism also comprises a third locking mechanism which is disposed between the first upper push rod 17 and the first lower push rod 16 and/or between the second upper push rod 27 and the second lower push rod 26. The first locking mechanism is used to stoop rotating and will not be described in more detail herein because it doesn't relate to technical points of the invention, thus, any locking configurations which can lock two rotation parts with each other are applicable to the invention. The second and third locking mechanisms are sliding locking mechanisms which are also not involved in the technical points of the invention, and any locking parts which can lock two sliding elements with each other are applicable to the invention, such locking mechanisms will not described in more detail herein because they are well known to those skilled in the art.

Figure 4:
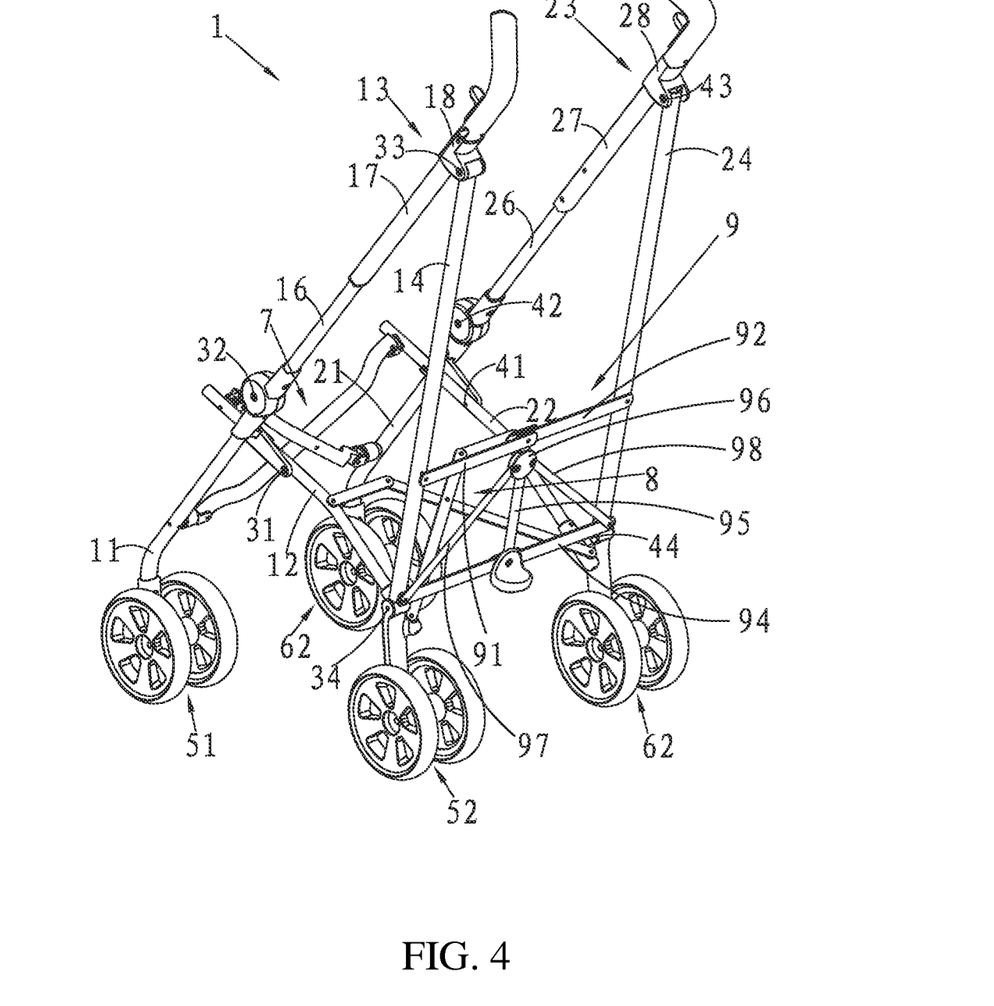
FIG. 4 is a perspective view of the frame in the positive state according to embodiment 1 of the invention.
Figure 5:
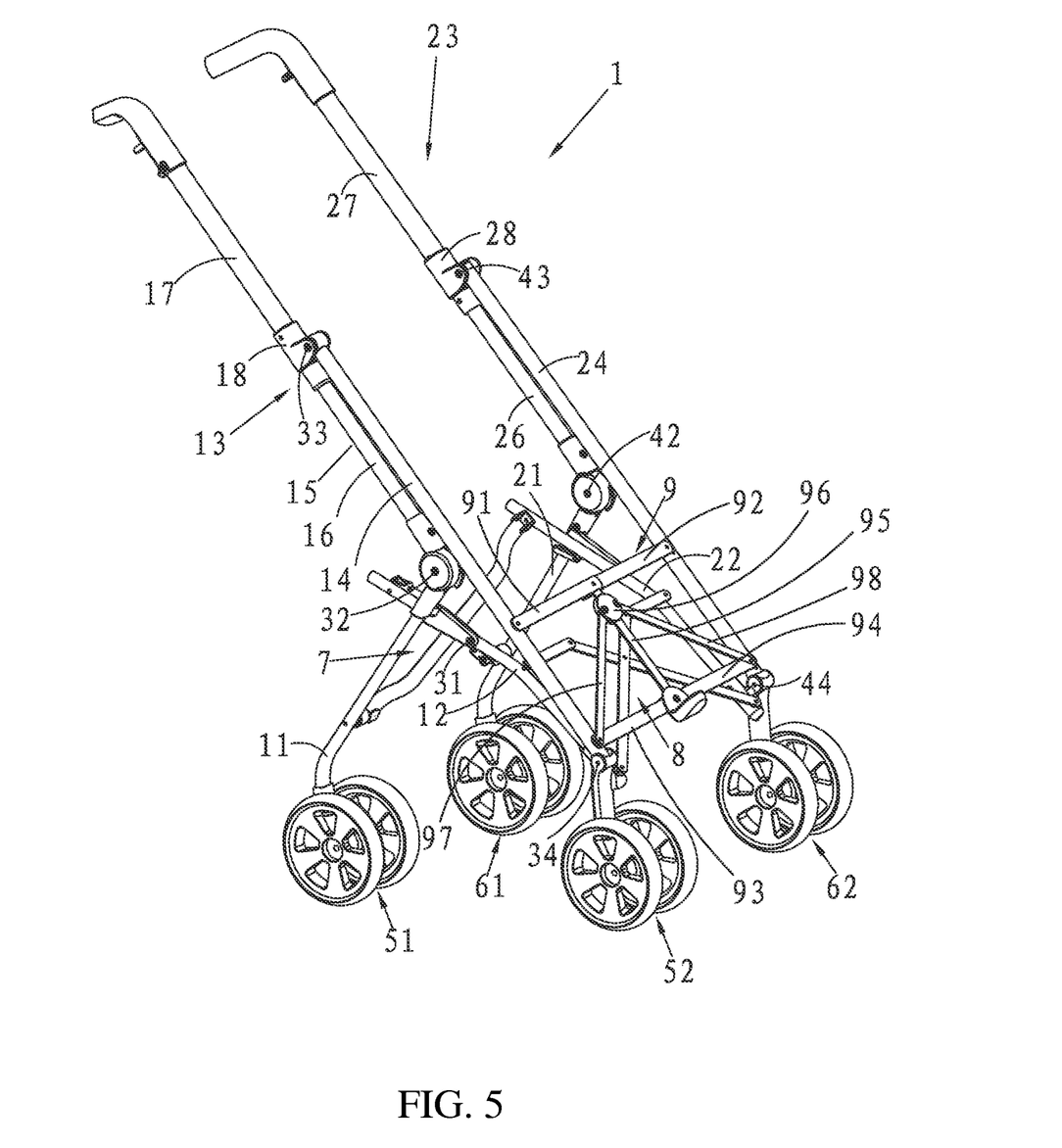
FIG. 5 is a perspective view of the frame in the reverse state according to embodiment 1 of the invention.

The transverse brace assembly comprises a front support bracket 7 disposed between the first front bracket 11 and the second front bracket 21, and between the first seat rod 12 and the second seat rod 22. The front support bracket 7 comprises a first front support rod and a second front support rod which intersect and pivotably connect with each other at the intersection joint. The lower portion of the first front support rod is rotatably connected to the first front bracket 11 in the directions of two crossed planes by means of a first rotation joint, and the upper portion of the first front support rod is rotatably connected to the second seat rod 22 in the directions of two crossed planes by means of a third rotation joint, and the third rotation joint is in front of the second shaft 41. The lower portion of the second front support rod is rotatably connected to the second front bracket 21 in the directions of two crossed planes by means of a second rotation joint, the upper portion of the second front support rod is rotatably connected to the first seat rod 12 in the directions of two crossed planes by means of a fourth rotation joint, and the fourth rotation joint is in front of the first shaft 31. In this embodiment, the first rotation joint, the second rotation joint, the third rotation joint and the fourth rotation joint respectively are rotatably connected to the adjacent parts by two shafts vertical to each other. Additionally, the above fourth rotation joints can be replaced by ball joints.

The transverse brace assembly comprises a bottom support bracket 8 disposed between the first seat rod 12 and the second seat rod 22. The bottom support bracket 8 comprises a first bottom rod with one end being pivotably connected to the first seat rod 12, a second bottom rod with one end being pivotably connected to the second seat rod 22, a third bottom rod with one end being pivotably connected to the first seat rod 12, a fourth bottom rod with one end being pivotably connected to the second seat rod 22. The third and fourth bottom rods intersect and pivotably connect to each other at the intersection joint, the other end of the third bottom rod is pivotably connected to the other end of the second bottom rod, and the other end of the fourth bottom rod is pivotably connected to the other end of the first bottom rod.

The transverse brace assembly further comprises a rear support bracket 9 disposed between the first rear bracket 14 and the second rear bracket 24, and the rear support bracket 9 comprises:

an upright rod 95;

a first transverse rod 91, one end of which is pivotably connected to the upper end of the upright rod 95, and the other end to the first rear bracket 14;

a second transverse rod 92, one end of which is pivotably connected to the upper end of the upright rod 95, and the other end to the second rear bracket 24;

a sliding block 96 slidably disposed on the upright rod 95;

a third transverse rod 93, one end of which is pivotably connected to the lower end of the upright rod 95, and the other end to the first rear bracket 14;

a fourth transverse rod 94, one end of which is pivotably connected to the lower end of the upright rod 95, and the other end to the second rear bracket 24;

a first tilted rod 97, one end of which is pivotably connected to the sliding block 96, and the other end to the third transverse rod 93; and a second titled rod 98, one end of which is pivotably connected to the sliding block 96, and the other end to the fourth transverse rod 94.

Embodiment 2

Figure 7:
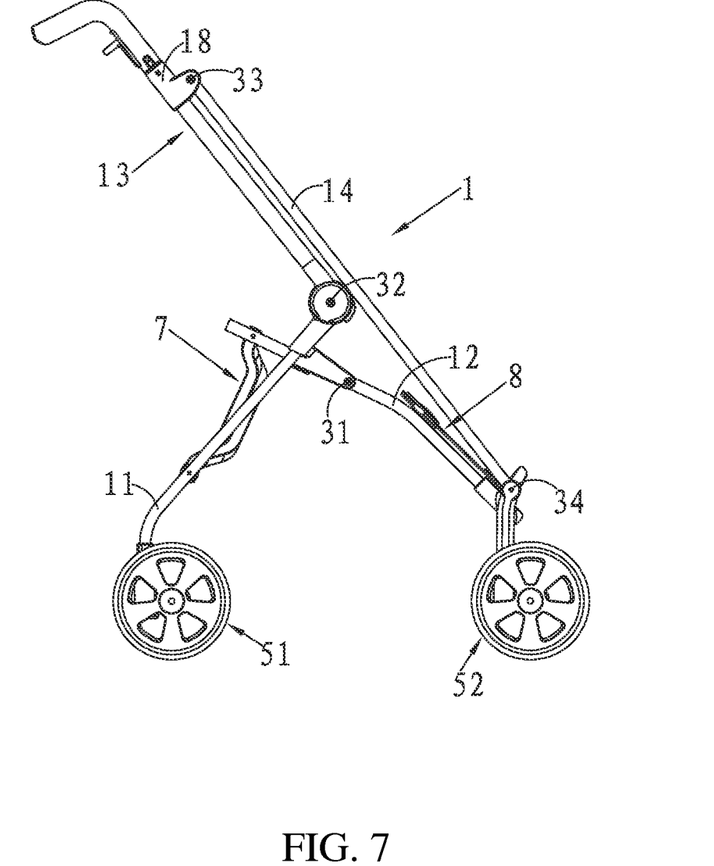
FIG. 7 is a front view of the frame in the reverse state according to embodiment 2 of the invention.
Figure 8:
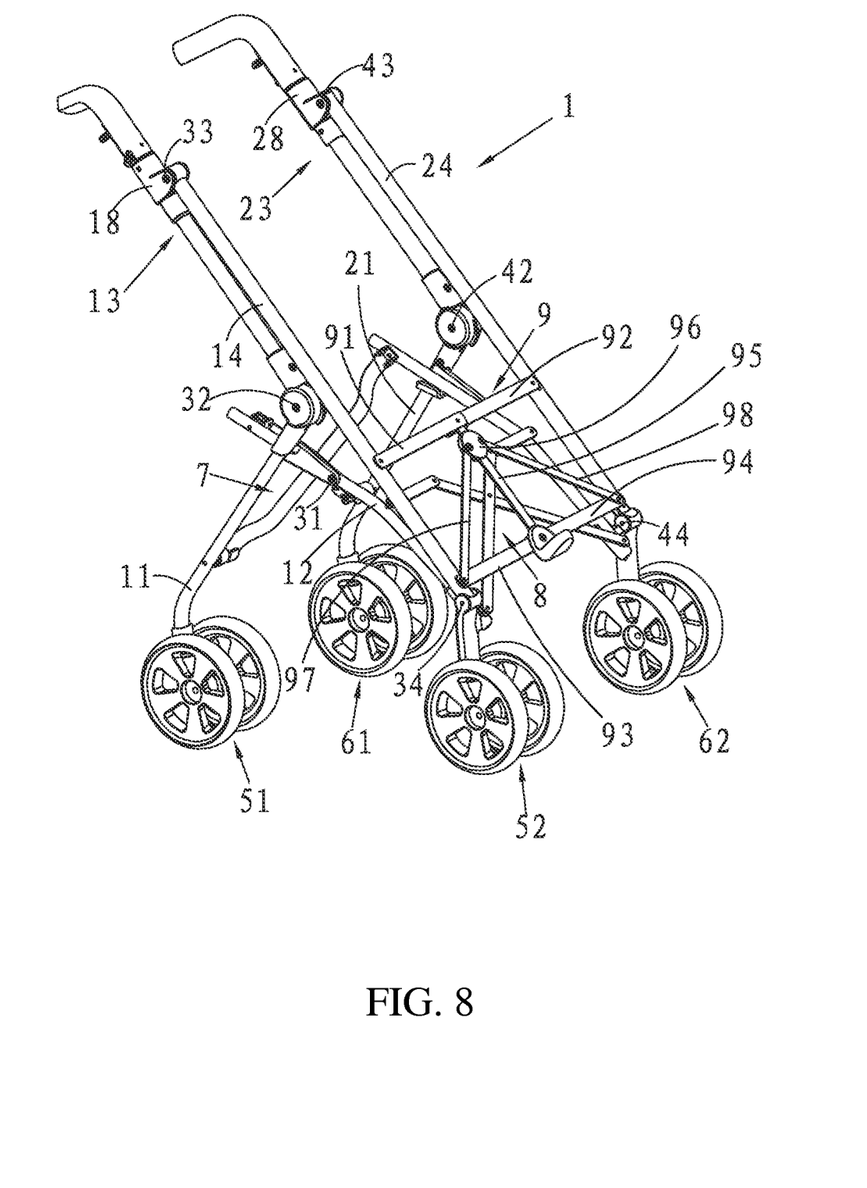
FIG. 8 a perspective view of the frame in the reverse state according to embodiment 2 of the invention.

As shown in FIGS. 7 and 8, the embodiment 2 is different from the embodiment 1 in that the first push rod 13 and second push rod 23 have different structures. In this embodiment, the first push rod 13 and second push rod 23 respectively is a one-piece rod. As compared with the embodiment 1, when the frame 1 is in the unfolded position, the uppermost parts of the first push rod 13 and second push rod 23 are in a lower position, and when the frame 1 is in the folded position, the volume of the frame 1 is bigger.

Embodiment 3

Figure 9:
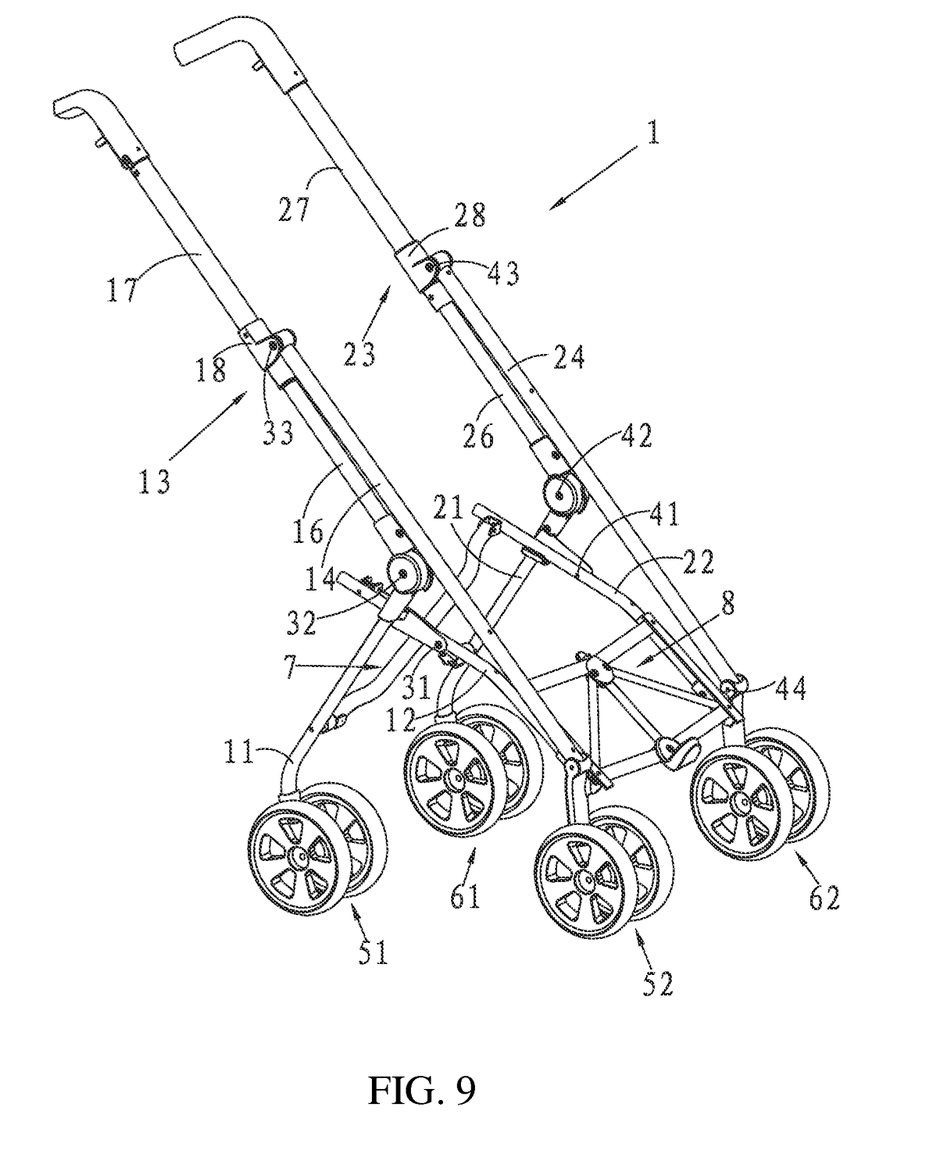
FIG. 9 is a perspective view of the frame in the reverse state according to embodiment 3 of the invention.
Figure 10:
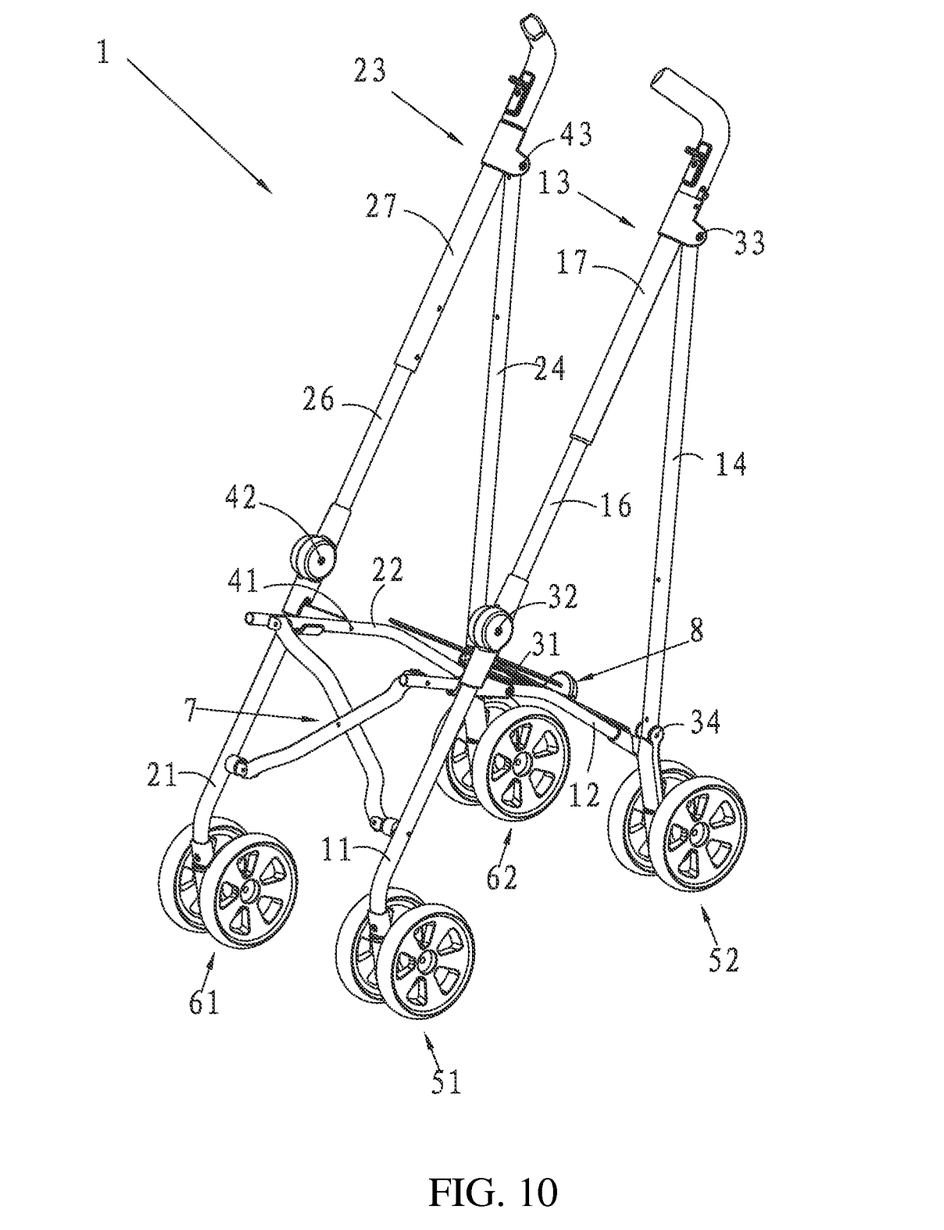
FIG. 10 is a perspective view of the frame in the positive state according to embodiment 3 of the invention.

As shown in FIGS. 9 and 10, the embodiment 3 is different from the embodiment 1 in that the transverse brace assembly has different configuration. In the embodiment 1, the transverse brace assembly comprises a front support bracket 7, a bottom support bracket 8 and a rear support bracket 9, but in the embodiment 3, the transverse brace assembly only comprises a front support bracket 7 and a bottom support bracket 8 without the rear support bracket 9, wherein the configuration of the front support bracket 7 is the same as that in embodiment 1, and the configuration of the bottom support bracket 8 is the same as that of the rear support bracket 9 in embodiment 1.

Embodiment 4

Figure 11:
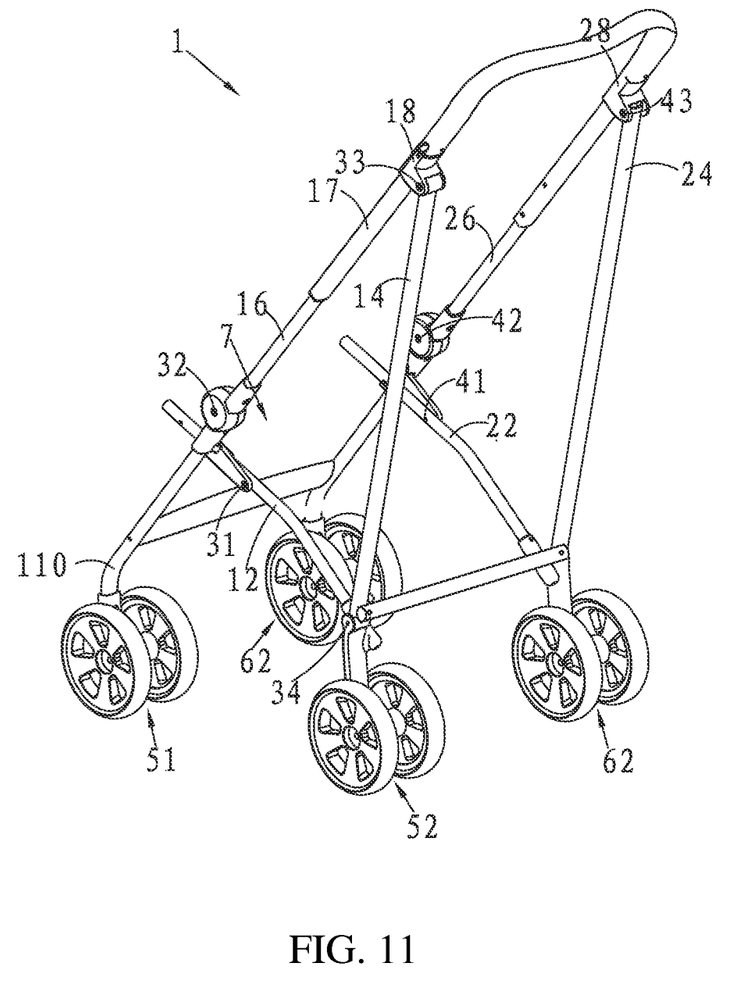
FIG. 11 is a perspective view of the frame in the positive state according to embodiment 4 of the invention.
Figure 12:
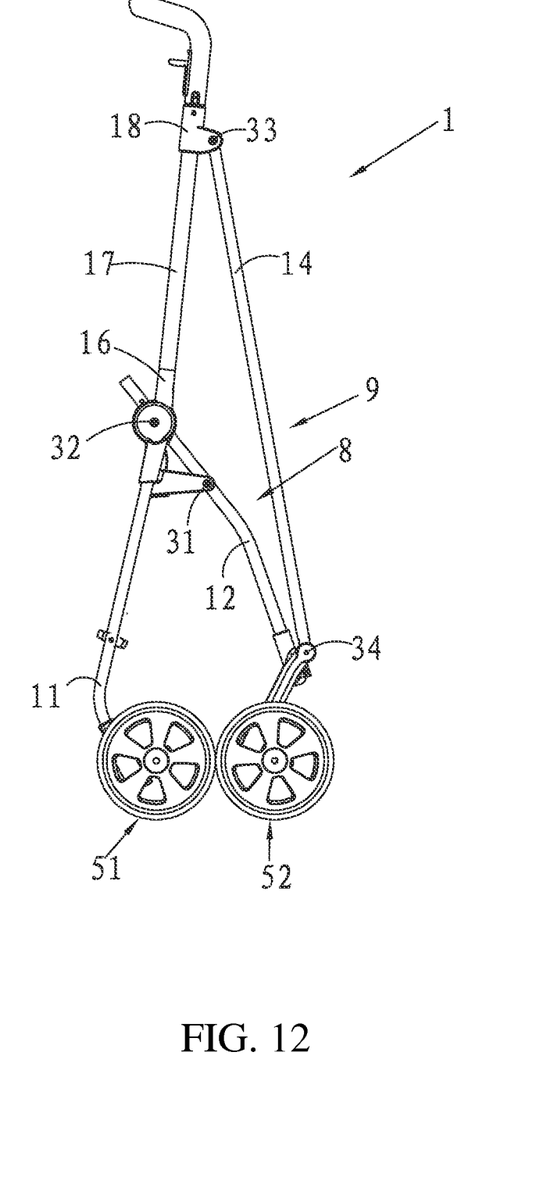
FIG. 12 is a perspective view of the frame in the state of folding according to embodiment 4 of the invention.

As shown in FIGS. 11 and 12, the frame of this embodiment substantially is similar as that in the above embodiments. The embodiment 4 is different from the embodiments 1, 2 and 3 in that: the frames in the embodiments 1, 2, 3 can be folded in left-right directions (transversely), and the frame in the embodiment 4 can not be transversely folded. Thus, in embodiment 4 the transverse brace assembly which can be transversely folded is not necessarily provided.

The frame comprises:

A front bracket 110 which is in the shape of H, U (opening upwards) or T (not shown), the front wheel assembly may be configured as single front wheel assembly which is disposed at the lower portion of the front bracket, or alternatively, the front wheel assembly may comprise a first front wheel assembly 51 and a second front wheel assembly 61 which are respectively arranged at left and right sides of the lower portion of the front bracket 110;

A first seat rod 12 and a second seat rod 22, the upper portion of the first seat rod 12 being rotatably connected to the upper portion of the first front bracket about a first shaft 31, and the upper portion of the second seat rod 22 being rotatably connected to the upper portion of the first front bracket about a second shaft 41, and the first rear wheel assembly 52 and the second rear wheel assembly 62 respectively being correspondingly disposed at lower portions of the first seat rod 12 and second seat rod 22;

a U-shaped (opening upwards) push rod, on two long arms at two opposite sides of which the first sliding element 18 and the second sliding element 28 respectively are provided, and the lower portions of the two long arms respectively being rotatably connected to the front bracket 110 about the third shaft 32 and the fourth shaft 42;

a first rear bracket 14, the upper portion of which is rotatably connected to the first sliding element 18 about a fifth shaft 33, and the lower portion of which is rotatably connected to the first seat rod 12 about a seventh shaft 34; and a second rear bracket 24, the upper portion of which is rotatably connected to the second sliding element 28 about a sixth shaft 43, and the lower portion of which is rotatably connected to the second seat rod 22 about a eighth shaft 34.

For the configuration of the push rod, similarly, the push rod may comprise a first lower push rod 16 with lower portion being rotatably connected to the upper portion of the front bracket 110 about the third shaft 32 and a second lower push rod 26, and a upper push rod 17 slidably connected to the first lower push rod 16 and the second lower push rod 26 respectively, and the first sliding element 18 and the second sliding element 28 are slidably connected on the upper push rod 17.

The locking mechanism comprises a third locking mechanism disposed between the upper push rod 17 and the first lower push rod 16 and/or the second lower push rod 26. Additionally, the locking mechanism also comprises a first locking mechanism disposed between the lower portion of the push rod and the upper portion of the front bracket 110, and a second locking mechanism disposed between the push rod and the first sliding element 18 and/or the second sliding element 28.

As a variant of the embodiment 4, the push rod may be provided as single rod. The first seat rod 12 and second seat rod 22 also may be configured as one-piece rod, such as, the whole rod is H-shaped.

As described above, the detailed description is illustrated according to the spirit of the invention, but the invention is not limited to the aforementioned embodiments and implementing methods. Many variations and implements can be made within the scope of the invention by those skilled in the related art.

The invention claimed is:

1. A baby carriage, comprising a foldable frame, a seat disposed on the frame, a locking mechanism for locking the frame when it is unfolded, a first front wheel assembly and a second front wheel assembly, and a first rear wheel assembly and a second rear wheel assembly disposed at the bottom of the frame, wherein the frame comprises:

a first front bracket, at a lower portion of which the first front wheel assembly is arranged;

a second front bracket, at a lower portion of which the second front wheel assembly is arranged;

a first seat rod on which the seat is disposed, with a front portion of the first seat rod being rotatably connected to the first front bracket, and a rear portion of the first seat rod being provided with the first rear wheel assembly;

a second seat rod on which the seat is disposed, with a front portion of the second seat rod being rotatably connected to the second front bracket, and a rear portion of the second seat rod being provided with the second rear wheel assembly;

a first push rod, comprising a first lower push rod with a lower portion being rotatably connected to an upper portion of the first front bracket or the front portion of the first seat rod and a first upper push rod slidably connected to the first lower push rod, wherein the first upper push rod and first lower push rod are locked with each other when the frame is unfolded, and the first upper push rod can slide relative to the first lower push rod when the frame is in the course of folding or unfolding;

a second push rod, comprising a second lower push rod with a lower portion being rotatably connected to an upper portion of the second front bracket or the front portion of the second seat rod and a second upper push rod slidably connected to the second lower push rod, wherein the second upper push rod and second lower push rod are locked with each other when the frame is unfolded, and the second upper push rod slides relative to the second lower push rod when the frame is in the course of folding or unfolding;

a first rear bracket with a lower portion being rotatably connected to the first seat rod;

a second rear bracket with a lower portion being rotatably connected to the second seat rod;

a first sliding element for connecting the first upper push rod with an upper portion of the first rear bracket, the first sliding element is slidably disposed on the first upper push rod and the first rear bracket, and the first upper push rod and the first rear bracket rotatably connected to the first sliding element;

a second sliding element for connecting the second upper push rod with an upper portion of the second rear bracket, the second sliding element is slidably disposed on the second upper push rod and the second rear bracket, and the second upper push rod and the second rear bracket rotatably connected to the second sliding element;

wherein when the frame is unfolded, the first push rod and the second push rod have two working positions, comprising a first working position where the fist push rod and the second push rod incline backwards from down to up with an upper end being located behind and above the seat, and a second working position where the first push rod and the second push rod incline forwards from down to up with its upper end being located in front of and above the seat, when the frame is folded the front and rear wheel assemblies support the frame on a plane.

2. The baby carriage as claimed in claim 1, wherein each pair of the first and second front brackets, the first and second seat rods, the first and second push rods, the first and second rear brackets, and the first and second sliding elements are provided at two opposite sides of the frame in such a way that the push rod, front bracket, seat rod, rear bracket and sliding element are connected together at each side to form a main body of a side frame, wherein the two side frames at each side of the frame is connected by a transverse brace assembly, which is transversely folded to draw the two side frames close to each other.

3. The baby carriage as claimed in claim 2, wherein the transverse brace assembly comprises a front support bracket including two front support rods which intersect and rotatably connect with each other at the intersection joint, with two upper ends respectively being rotatably connected to the first and second seat rods, and two lower ends respectively being rotatably connected to the first and second front brackets, in such a way that the connection location of the upper ends of the two front support rods with the first and second seat rods is in front of the connection locations of the first and second seat rods with the first and second front brackets.

4. The baby carriage as claimed in claim 2, wherein the transverse brace assembly comprises a bottom support bracket disposed between the first and second seat rods.

5. The baby carriage as claimed in claim 4, wherein the bottom support bracket comprises:

a cross brace consisted of two rods which intersects and hingedly connect with each other at the intersection joint; and two connecting rods, each with one end being rotatably connected to one of the two adjacent ends of the cross brace, the other end to one of the first and second seat rods, and the other two ends of the cross brace respectively being rotatably connected to the first and second seat rods at two sides of the frame.

6. The baby carriage as claimed in claim 2, wherein the transverse brace assembly further comprises a rear support bracket disposed between the first and second rear brackets.

7. The baby carriage as claimed in claim 6, wherein the rear support bracket comprises:

an upright rod;

a first transverse rod and a second transverse rod, each of which is provided with an inner end rotatably connected to an upper end of the upright rod, and an outer end rotatably connected to one of the rear brackets at two sides of the frame;

a sliding block slidably disposed on the upright rod;

a third transverse rod and a fourth transverse rod, each of which is provided with an inner end rotatably connected to a lower end of the upright rod, and an outer end rotatably connected to one of the rear brackets at two sides of the frame;

a first tilted rod, two ends of which respectively are pivotably connected to the sliding block and the third transverse rod; and a second titled rod, two ends of which respectively are pivotably connected to the sliding block and the fourth transverse rod.

8. The baby carriage as claimed in claim 1, wherein the axes of rotation of wheels of first and second front wheel assemblies and the first and second rear wheel assemblies are substantially in a same plane, on which the projection of the connection location of the first and second sliding elements with the first and second push rods or the first and second rear brackets is between the front and rear wheels.

9. The baby carriage as claimed in claim 1, wherein the locking mechanism comprises a first locking mechanism for relatively locking the first and second lower push rods with the first and second front brackets.

10. The baby carriage as claimed in claim 1, wherein the locking mechanism further comprises a second locking mechanism for relatively locking the first and second sliding elements with the first and second upper push rods and first and second rear brackets.

11. The baby carriage as claimed in claim 1, wherein the locking mechanism further comprises a third locking mechanism for relatively locking the first and second upper push rods with the first and second lower push rods.

* * * * *